Figure 1:
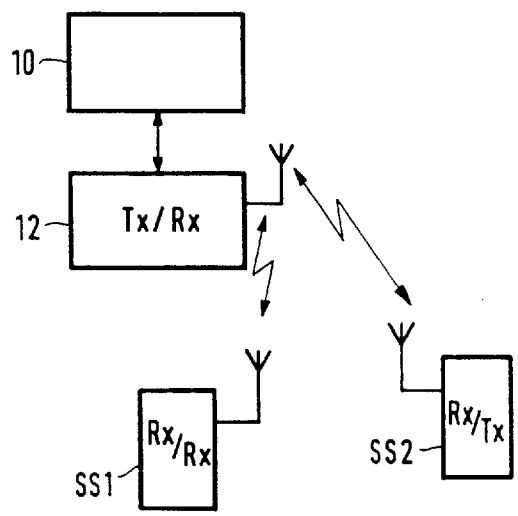

United States Patent

Gibson

Patent Number: 5,881,092
Date of Patent: Mar. 9, 1999

[54] SPREAD SPECTRUM TELECOMMUNICATION SYSTEM

[75] Inventor: Rodney W. Gibson, Haywards Heath, England

[73] Assignee: U.S. Philips Corporation, New York, N.Y.

[21] Appl. No.: 754,663

[22] Filed: Nov. 21, 1996

[30] Foreign Application Priority Data

Dec. 15, 1995 [GB] United Kingdom .................... 9525637

[51] Int. Cl.⁶ ............................. H04B 15/00; H04K 1/00; H04L 27/30
[52] U.S. Cl. ............................ 375/200; 375/200; 375/201; 375/202; 375/206; 375/208; 375/209; 375/210; 370/312; 370/342; 370/343; 370/344; 370/479
[58] Field of Search ...................... 375/200, 201, 375/202, 203, 204, 205, 206, 207, 208, 209, 210; 370/342, 330, 312, 343, 344, 479

[56] References Cited

U.S. PATENT DOCUMENTS

| 5,430,759 | 7/1995 | Yokev et al. ............................ 375/202 |
| 5,452,328 | 9/1995 | Rice ......................................... 375/210 |
| 5,499,266 | 3/1996 | Yokev et al. ............................ 375/202 |
| 5,519,718 | 5/1996 | Yokev et al. ............................ 375/202 |
| 5,544,167 | 8/1996 | Lucas et al. ............................... 370/18 |
| 5,546,422 | 8/1996 | Yokev et al. ............................ 375/202 |
| 5,579,306 | 11/1996 | Dent .......................................... 370/50 |
| 5,668,803 | 9/1997 | Tymes et al. ............................ 370/312 |

FOREIGN PATENT DOCUMENTS

| 0156335A2 | 10/1985 | European Pat. Off. ......... H04Q 7/04 |
| 0582754A1 | 2/1994 | European Pat. Off. .......... H04B 7/26 |
| WO9529547 | 11/1995 | WIPO . |
| WO9614716 | 5/1996 | WIPO . |

*Primary Examiner*—Stephen Chin
*Assistant Examiner*—Michael W. Maddox
*Attorney, Agent, or Firm*—Dicran Halajian

[57] ABSTRACT

A method of reducing computation in spread spectrum signals in which a spread spectrum signal sent by a transmitting station (SS1) includes a group and an individual identity code. A receiver (10, 12) stores the received signals based on their group codes and analyses the stored signals on a group by group basis. This greatly reduces this computation required when recovering individual messages from a number of simultaneously transmitted spread spectrum signals. Optionally the transmitting station may send the group and individual identity code signals simultaneously as quadrature signals.

13 Claims, 4 Drawing Sheets

SPREAD SPECTRUM TELECOMMUNICATION SYSTEM

The present invention relates to telecommunication systems in which a plurality of users transmit spread spectrum signals which are relayed to a system controller for recovery by techniques, such as correlation, which involves comparing each member of a set of code sequences with the received signals and by a process of trial and error decoding each of the received signals.

A particular, but not exclusive, application of the present invention is answer back message paging systems, for example of a type disclosed in PCT Patent Specification WO96/14716 in which secondary stations transmit registration requests and/or simple replies to messages received from a primary station as spread spectrum signals. In order to alleviate the problem of power control to overcome what is termed the near/far effect, a primary station transmits invitations at progressively different power levels inviting secondary stations to transmit their reply/registration signals and the secondary stations in response to receiving a just acceptable invitation signal transmit substantially simultaneously their reply/registration messages as spread spectrum signals, each signal having its own spreading code sequence. At the primary station, the strengths of the received spread spectrum signals lie within an acceptable tolerance range and can be processed as a group without extensive power control which is frequently a feature of known spread spectrum telecommunications systems.

At the primary station the processing requires matching a respective code sequence from a large set of code sequences with the received signals and recovering the registration and/or reply signal represented for example by the choice of code sequence used. In the situation of a primary station transmitting say 1,000 messages, each to an addressee having a unique address and its own limited set of code sequences indicating different responses, the primary station by knowing the addresses and the set of code sequences allotted to each address can conduct a limited search to see not only which secondary stations have received their message but also what is their reply. However in cases such as registration where the secondary stations are not known beforehand, a very large number of code sequences held by the primary station have to be compared with the received signals, which search is computationally intensive and represents the non-optimum use of the system capacity.

It is an object of the present invention to reduce the computation in a spread spectrum system.

According to a first aspect of the present invention there is provided a method of identifying a respective message from a plurality of messages transmitted by respective stations, comprising transmitting a code sequence and a group identifier as a spread spectrum signal, receiving said signals, noting from the group codes which of the groups contain messages and, for each of the groups noted, analysing the messages using the code sequences assigned to that group.

According to a second aspect of the present invention there is provided a telecommunications system comprising at least one primary station and a plurality of secondary stations, at least each of the said secondary stations comprising means capable of transmitting spread spectrum signals, each signal comprising an individual code sequence and an associated group code identifying a group to which the individual code sequence has been allocated, the or each primary station having means for recovering messages contained in the received spread spectrum signals, wherein the primary station comprises means for noting which of the groups contain signals, and means for analysing the spread spectrum messages in each group using the code sequences assigned to that group.

According to a third aspect of the present invention there is provided a primary station having means for transmitting a plurality of message signals, means for receiving a plurality of spread spectrum messages, each spread spectrum message comprising an individual code sequence and an associated group code, code sequence storage means for storing received spread spectrum signals in respective groups, means for noting which of the groups contain messages and means for using the code sequences to analyse the spread spectrum message signals in each of the groups noted.

According to a fourth aspect of the present invention there is provided a secondary station comprising transceiving means, means for storing a plurality of spread spectrum code sequences, means for generating a group code, means for transmitting a selected one of the code sequences and its group code either as a registration signal or as a reply to a message received from a primary station.

Figure 2:
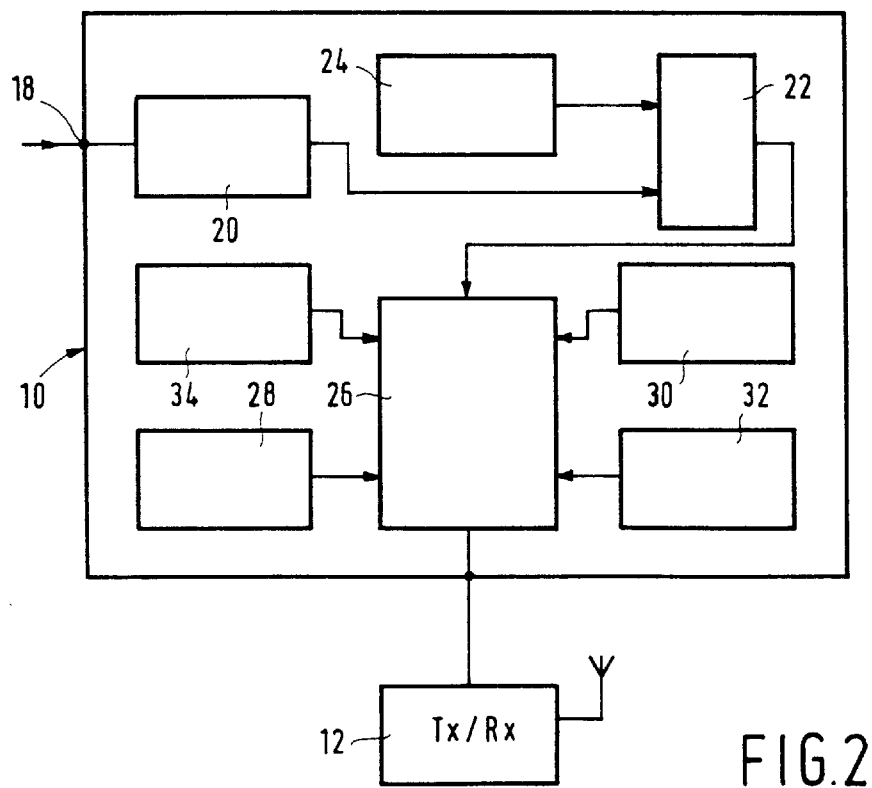
Figure 3:
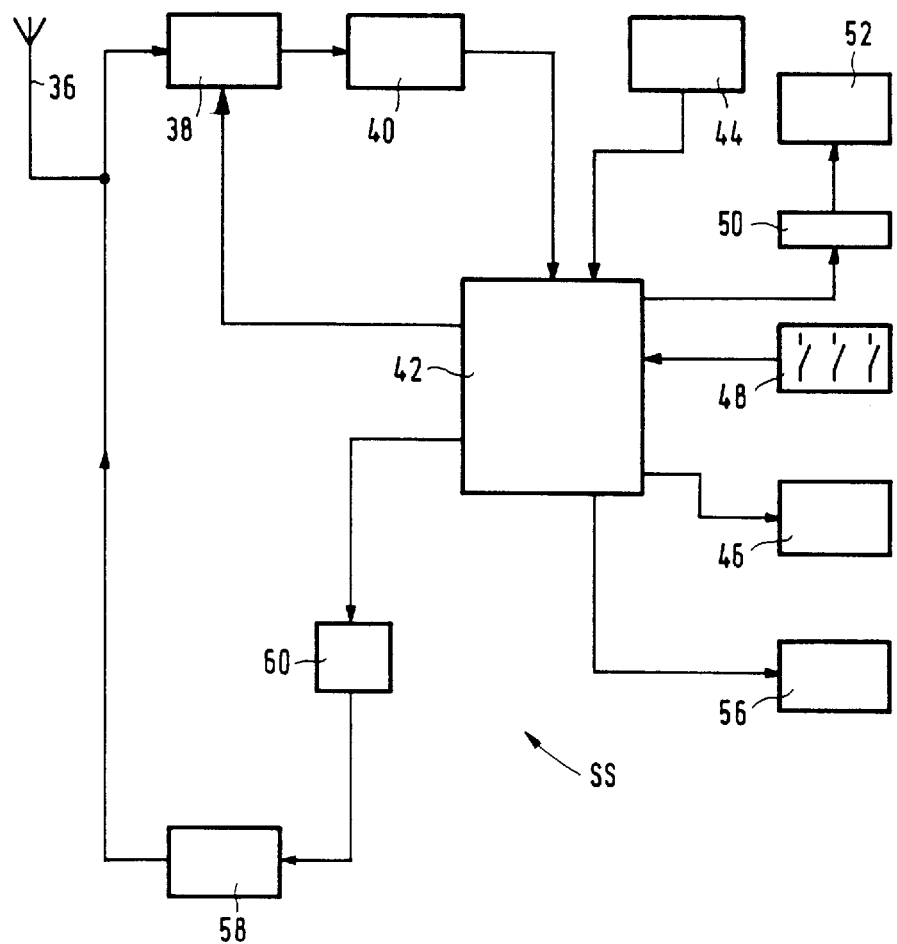
Figure 4:
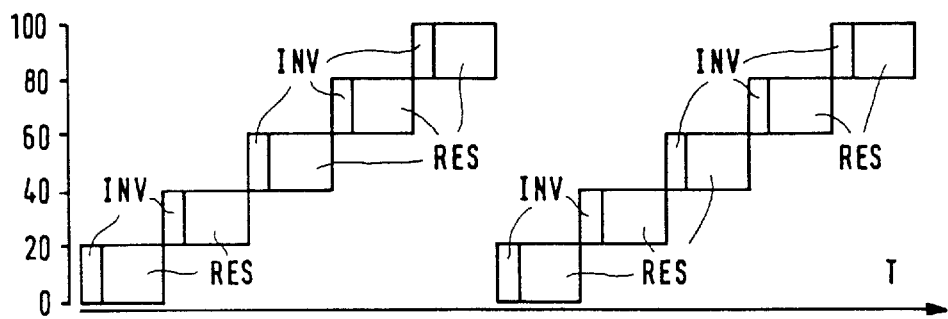
Figure 5:
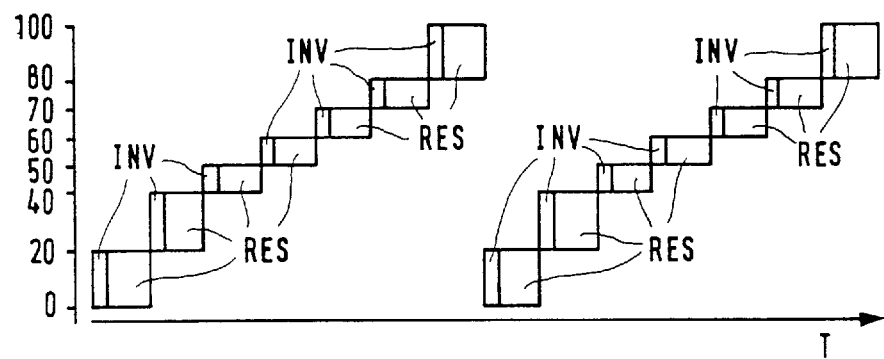
Figure 6:
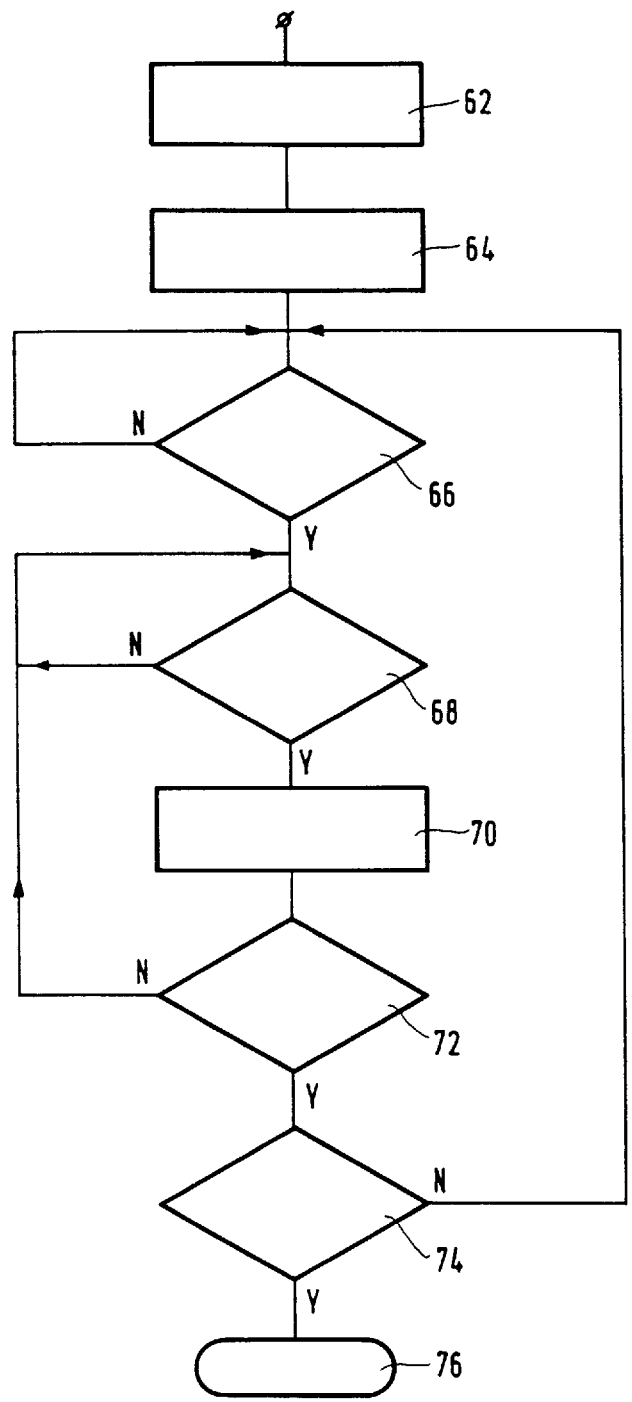

The present invention will now be described, by way of example, with reference to the accompanying drawings, wherein:

FIG. 1 is a diagram illustrating a selective call system for transmitting data messages, FIG. 2 is a block schematic diagram of a primary station comprising a system controller and a base station transceiver, FIG. 3 is a block schematic diagram of a secondary station, FIG. 4 is a diagram illustrating the primary station transmitting invitations at equally increasing increments of output power, FIG. 5 is a diagram illustrating the primary station transmitting invitations at non-equal increments of output power, and FIG. 6 is a flow chart relating to cycle of operations including an implementation of the search strategy.

In the drawings the same reference numerals have been used to indicate corresponding features.

Referring to FIG. 1, the selective call system comprises a system controller 10 which is connected to at least one base station transceiver 12, if necessary by land lines or other suitable links. In the event of there being more than one base station transceiver they may be geographically spaced apart and may operate in a quasi-synchronous mode.

Selective call secondary stations SS1, SS2 are provided, each of which comprises a transceiver which is able to receive transmissions from the transceiver 12 and is able to transmit a limited number of types of messages, including acknowledgements, at significantly lower power than the output power of the transceiver 12, for example 30 dB lower. The messages are transmitted as spread spectrum signals typically at an information rate of one thousandth of that transmitted by the transceiver 12 and a spreading sequence length of the order of $10^4$, for example 8191 chips per bit.

FIG. 2 shows an arrangement of a system controller 10 connected to the transceiver 12. The system controller 10 comprises an input 18 for data messages to be relayed via the transceiver 12. The messages are held in a store 20 from where they are relayed to a formatting stage 22 which appends an address code word to the message and divides the message into a plurality of concatenated code words of a pre-determined length, each code word including error detection/correction bits and optionally an even parity bit. The address code words are held in a store 24. A processor 26 is provided which controls the operation of the system controller in accordance with a program which is stored in a memory 28. Also connected to the processor 26 are a clock/timer stage 30, an invitation signal generator 32 and a store 34 for storing details of the code sequences which may be used by the secondary stations in transmitting their responses to the invitation messages. Once the data messages in the store 20 have been formatted in the stage 22 the processor 26 causes them to be relayed by the base station transceiver 12. The formatting of the data messages may conform to any known message format, such as the CCIR Radiopaging Code No. 1 (otherwise known as POCSAG), or any yet to be devised format. Once the messages have been transmitted, the processor arranges to transmit invitation-to-respond signals generated in the stage 32. In one arrangement, after each transmission of an invitation signal at a progressively increasing power level, a time interval is provided in which one or more secondary stations which may have received the invitation signal may respond by sending a reply as a spread spectrum signal. Once the time interval has elapsed then the invitation signal is repeated at increased power levels up to a maximum power level, each invitation being followed by a time period for reply. The levels may be evenly separated as shown in FIG. 4 or unevenly separated as shown in FIG. 5. In the latter instance the size of the steps may be determined beforehand or altered dynamically in operation in order to influence the number of responses transmitted after each invitation signal. In FIGS. 4 and 5 INV indicates the transmission of an invitation and RES the time allocated for responses. In another arrangement, the respective invitation signals are transmitted successively and a plurality of time slots are provided for receiving responses as spread spectrum signals, there being one time slot per power level. In a variant of the last mentioned arrangement, a plurality of sets of invitation signals are transmitted and a secondary station transmits a response to the lowest powered invitation signal received at a suitable moment following the transmission of the last set of invitation signals. In a further arrangement a single, full power invitation signal is transmitted.

The processor 26, following the transmission of an invitation signal, switches the transceiver 12 to receive and is ready to accept signals received by the transceiver 12, the outbound propagation path to the or each secondary station being substantially the same as that of the inbound propagation path. Previously in order to identify each of the responses which is sent as a spread spectrum signal, it has been necessary to match each of the code sequences sequentially with the received signals which are held in a buffer and when a correlation is obtained then the response is noted and further code sequences are matched with the received signals in order to recover any other responses which may be present.

FIG. 3 is a block schematic diagram of a secondary station SS having the capability of transmitting responses to invitation signals as spread spectrum signals. The secondary station SS comprises an antenna 36 which is coupled to a receiver stage 38. An output of the receiver stage 38 is coupled to an input of a decoder 40. A microcontroller 42 is coupled to the output of the decoder 40 and controls the operation of the secondary station in accordance with a program held in a read only memory (ROM) 44. The microcontroller 42 has inputs/outputs, as appropriate, coupled to annunciating means 46 which may be audio, visual and/or tactile, a keypad 48, data output means, for example an LCD driver 50 which is coupled to an LCD panel 52, and a random access memory (RAM) 56 for storing any messages which have been received and decoded.

In operation the receiver stage 38 is energised in response to the particular battery economising protocol followed by the secondary station SS. Optionally the decoder 40 and the microcontroller 42 may "sleep" when not required, the microcontroller 42 being woken by an internal timer (not shown) or an interrupt signal and in so doing waking up other stages of the secondary station, as appropriate. When an address code word is received, it is demodulated, decoded, error corrected and checked to see if it is one assigned to the secondary station or an invitation to send a message to the primary station. Assuming it is an address code word assigned to the secondary station then depending on the programming of the microcontroller 42, the annunciating means 46 may be activated to inform the user that a call has been received. If a short message is concatenated with the paging call then once the message has been decoded and error checked/corrected, the microcontroller 42 causes the decoded message to be stored in the RAM 56. By actuating a key or keys of the keypad 48, a user can instruct the microcontroller 42 to read-out the message from the RAM 56 to the LCD driver 50 which will cause the message to be displayed on the screen 52. The operation described so far is typical for many alphanumeric message pagers conforming to the POCSAG standard.

The illustrated secondary station SS includes a low power transmitter 58 whereby acknowledgements and/or short reply messages can be relayed to the or any in-range base station transceiver. The actual acknowledgement or reply message is generated by the microcontroller 42 either automatically or by actuation of the keypad 48 by the user and will be transmitted as a spread spectrum signal. One or more near orthogonal pseudo-random code sequences may be stored or generated in a stage 60 or in the microcontroller 42. The microcontroller 42 controls the reading out of a code sequence to a transmitter 58. The code sequence may be one of a set of near orthogonal sequences or a time shifted version of such a sequence. The chosen sequence may represent the identity of the secondary station and/or the number of a message received and/or coded reply as shown below, for example from a secondary station number 370.

Code Sequence 371—secondary station in the area for the purposes of registration only.
Code Sequence 372—Received last message.
Code Sequence 373—Read message(s).
Code Sequence 374—Answer "Yes".
Code Sequence 375—Answer "No".
Code Sequence 376—Resend last message.

In a practical situation strings of messages are transmitted sequentially to different secondary stations and depending on how the system is configured, the secondary stations transmit spread spectrum signals as responses.

In order to reduce the computation involved in correlating the code sequences with the received spread spectrum signals, especially registration signals because they represent an unknown quantity both in number and type, the spread spectrum signals are divided into groups which are then analysed to determine the nature of the received signals.

In an example of spread spectrum signals being transmitted in response to an invitation signal of some sort, for example either a general invitation signal transmitted at full power or a sequence of invitation signals at increasing power levels, the spread spectrum codes are divided into predetermined or dynamically determined groups and the secondary stations transmit both a group code and an individual code. A search of the code sequences to identify the messages contained in the substantially simultaneously received spread spectrum signals is first done group by group and then only those groups found to be present are searched for individual codes with the result that the overall search may be shorter.

In one embodiment of the present invention the secondary stations are given, or implicitly have, a group code as well as their individual identity. When invited to do so they transmit both their group code and their identity. At the system controller 10 the received signal is first analysed to detect thepresence of the group codes. A second analysis comprises searching for identities only within the groups detected. The group codes may be sent separated in time from the individual identities, but this reduces the system capacity. An alternative is to send the two codes simultaneously by quadrature phase modulating a carrier.

The savings available by this technique may be illustrated by the following. The optimum group size depends on the number of users replying. Suppose there are N identities (users) but only R users or secondary stations reply (for instance to register). The system controller 10 divides the population into x groups. Initially x correlations are done for the group codes and at the most R of them are found to be present. Each of the R groups is then searched for N/x possible identities.

| | |
|---|---|
| The total number of correlations is thus: | $x + R*N/x$ |
| which has a minimum: | $x_{opt} = sqrt(RN)$, |
| and the number of correlations is then: | $2x$. |
| If N = 1 million this gives, in round FIGS: | |

| R (No. of replies) | $x_{opt}$ (No. of groups) | Maximum No. of correlations |
|---|---|---|
| 10 | 3000 | 6 000 |
| 30 | 5500 | 11 000 |
| 100 | 10 000 | 20 000 |
| 300 | 17 000 | 34 000 |
| 1000 | 30 000 | 60 000 |

The system controller 10 sets a group size based on the expected or statistically determined number of replies, and instructs the secondary stations accordingly as part of the invitation signal. For example if the secondary station identities are regarded as the integers 1 to 1 million, the secondary stations could be told to divide their ident by a suitable number n and use the code denoted by the integer part of the result as their group code.

The threshold for detection of the group codes may be lower than that for the individual identities because the consequence of a false group detection is only an increase, usually negligible, in the search computation load. For example a false rate of 1 in 100 for group detection would result in only about 1% extra load whereas the required false rate for an individual reply might be 1 in many thousands. This lower required false rate may be used to advantage in several different ways, such as to reduce transmit power for the group code, shorter transmission time for the group code and/or shorter analysis times.

In the case of dynamically determining the number of groups, the system controller 10 using statistical information on say registrations at a particular time of day, day of the week and season may decide on say four groups and when transmitting the invitation signals it may either instruct those secondary stations wishing to transmit to send a group code comprising the two most significant bits (MSB) of the secondary stations address. The group code and the spread spectrum message code may be transmitted simultaneously by quadrature modulation of a carrier wave. Once the system controller has identified and noted the groups present the received signals are analysed subsequently on a group by group basis. The number of groups may be increased or reduced by increasing or decreasing the number of MSBs used as the group designator.

FIG. 6 is a flow chart illustrating a cycle of operations. The flow chart commences with block 62 which indicates the system controller deciding on the number of groups. Block 64 denotes the base station transceiver transmitting invitations containing the instructions to the secondary stations as to how to select their group. In block 66 a check is made as to whether a group code is present and if it is not (N) to look for the next group code. On the other hand if the group code is present (Y) the flow chart proceeds to the block 68 in which the correlation of the code sequences in that group with the spread spectrum signals takes place. If a correlation is found (Y), the code sequence is noted, block 70, the correlating code sequence itself being indicative of a reply or message from a secondary station. In the block 72 a check is made to see if all signals in the group have been analysed. If the answer is no (N) the flow chart reverts to the block 68 but if the answer is yes (Y) the flow chart proceeds to the block 74 in which a check is made to see if the group being analysed is the last group. If the answer is no (N) the flow chart reverts to the block 66 but if it is the last group (Y) the flow chart proceeds to the terminating block 76.

From reading the present disclosure, other modifications will be apparent to persons skilled in the art. Such modifications may involve other features which are already known in the design, manufacture and use of spread spectrum telecommunications systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of identifying a respective message from a plurality of messages transmitted by respective stations, comprising transmitting a plurality of spread spectrum signals each having a code sequence and a group identifier, receiving said spread spectrum signals, noting from group codes which groups contain the messages and, for each of the groups noted, analysing the messages using code sequences assigned to that group, wherein a primary station transmits an invitation to a plurality of secondary stations inviting those who want to transmit a signal to reply, said invitation signal including indicia informing the secondary stations how to determine a group code which is transmitted together with an individual code sequence.

2. A method as claimed in claim 1, characterised in that the group code and the code sequence are transmitted simultaneously by quadrature modulation of a carrier wave.

3. A method as claimed in claim 1, characterised in that the primary station estimates the number of groups required.

4. A method as claimed in claim 1, characterised in that the primary station adapts the number of groups required by instructing those secondary stations wanting to send a message to transmit a code corresponding to a number of most significant bits of their identification codes as group identifiers.

5. A telecommunications system comprising at least one primary station and a plurality of secondary stations, each of said secondary stations comprising means capable of transmitting spread spectrum signals, each of said spread spectrum signals comprising an individual code sequence and an associated group code identifying a group to which the individual code sequence has been allocated, the at least one primary station having means for recovering messages contained in the spread spectrum signals received from said plurality of secondary stations, wherein the at least one primary station comprises means for noting which groups contain said messages, means for analyzing the messages in each group using the code sequences assigned to that group, means for transmitting an invitation signal, said invitation signal inviting said plurality of secondary stations to reply, said invitation signal including indicia informing the secondary stations how to determine the associate group code which the secondary station transmits together with the individual code sequence.

6. A telecommunications system as claimed in claim 5, wherein each of the plurality of secondary stations has means for generating the group code and the individual code sequence, and means for quadrature modulating the group code and the individual code sequence simultaneously onto a carrier.

7. A telecommunications system comprising at least one primary station and a plurality of secondary stations, each of said secondary stations comprising means capable of transmitting spread spectrum signals, each of said spread spectrum signals comprising an individual code sequence and an associated group code identifying a group to which the individual code sequence has been allocated, the at least one primary station having means for recovering messages contained in the spread spectrum signals received from said plurality of secondary stations, wherein the at least one primary station comprises means for noting which groups contain said messages, means for analyzing the messages in each group using the code sequences assigned to that group, and means for estimating the number of groups required.

8. A system as claimed in claim 5, characterised in that the primary station has means for dynamically determining the number of groups required and in response thereto has means for instructing those secondary stations wanting to send a message to transmit a predetermined number of most significant bits of their identification codes as group codes.

9. A primary station having means for transmitting a plurality of message signals, means for receiving a plurality of spread spectrum messages, each spread spectrum message comprising an individual code sequence and an associated group code, code sequence storage means for storing received spread spectrum signals in respective groups, means for noting which of the groups contain messages, means for using the code sequences to analyze the spread spectrum message signals in each of the groups noted, means for estimating the number of secondary stations likely to be active at a particular time of day, and means responsive to said estimates for determining the number of groups into which the spread spectrum messages should be placed.

10. A primary station having means for transmitting a plurality of message signals, means for receiving a plurality of spread spectrum messages, each spread spectrum message comprising an individual code sequence and an associated group code, code sequence storage means for storing received spread spectrum signals in respective groups, means for noting which of the groups contain messages, means for using the code sequences to analyze the spread spectrum message signals in each of the groups noted, and means for generating an invitation signal, said invitation signal including indicia informing secondary stations how to determine the group code which is transmitted together with the individual code sequence.

11. A primary station having means for transmitting a plurality of message signals, means for receiving a plurality of spread spectrum messages, each spread spectrum message comprising an individual code sequence and an associated group code, code sequence storage means for storing received spread spectrum signals in respective number of groups, means for noting which of the groups contain messages, means for using the code sequences to analyze the spread spectrum message signals in each of the groups noted, and means for adapting the number of groups required by instructing those secondary stations who want to send a message to transmit a predetermined number of most significant bits of their identification as group identifiers.

12. A secondary station comprising transceiving means, means for storing a plurality of spread spectrum code sequences, means for generating a group code, and means for transmitting a selected one of the code sequences and its group code either as a registration signal or as a reply to a message received from a primary station, said message including indicia informing the secondary station how to determine a group code which is transmitted together with an individual code sequence.

13. A secondary station as claimed in claim 12, characterised in that the transceiving means includes quadrature modulating means for quadrature modulating the group code and the code sequence on a carrier.

* * * * *